US007600787B2

(12) United States Patent
White

(10) Patent No.: US 7,600,787 B2
(45) **Date of Patent: *Oct. 13, 2009**

(54) PERSONAL BAGGAGE IDENTIFICATION SYSTEM

(76) Inventor: Andre M. White, 5122 Hunters Luck, Stone Mountain, GA (US) 30088

( * ) Notice: Subject to any disclaimer, the term of this patent is extended or adjusted under 35 U.S.C. 154(b) by 281 days.

This patent is subject to a terminal disclaimer.

(21) Appl. No.: 11/708,270

(22) Filed: Feb. 20, 2007

(65) Prior Publication Data

US 2008/0073901 A1 Mar. 27, 2008

Related U.S. Application Data

(63) Continuation-in-part of application No. 10/956,390, filed on Oct. 1, 2004, now Pat. No. 7,195,158.

(51) Int. Cl.
*B42D 15/00* (2006.01)
*G09C 3/00* (2006.01)

(52) U.S. Cl. .............................. 283/80; 235/384; 40/6

(58) Field of Classification Search .................. 283/80, 283/81, 105, 107, 101; 40/6, 634; 235/384
See application file for complete search history.

(56) References Cited

U.S. PATENT DOCUMENTS 187,942 A * 2/1877 Untermeyer ................ 40/655
2,925,675 A * 2/1960 Lumpkin ..................... 40/643
3,648,838 A * 3/1972 Hiromura .................. 209/3.3
4,051,996 A * 10/1977 Ross et al. .................... 229/72
5,514,862 A * 5/1996 Salzano ...................... 235/487
5,649,380 A * 7/1997 Zhang ......................... 40/630
6,186,554 B1 * 2/2001 Raming ....................... 283/81
6,589,623 B2 * 7/2003 Roth ......................... 428/40.1
7,104,439 B2 * 9/2006 Dewan et al. ............... 235/375
7,195,158 B2 * 3/2007 White ........................ 235/384
7,306,837 B2 * 12/2007 Hagen et al. ............... 428/40.1

FOREIGN PATENT DOCUMENTS

DE 2650472 A * 5/1978

OTHER PUBLICATIONS www.wikipedia: definition of key fob.*
www.yahoo.com: definitions of parcel and baggage.*

* cited by examiner

*Primary Examiner*—Dana Ross
*Assistant Examiner*—Jamila Williams
(74) *Attorney, Agent, or Firm*—John L. James

(57) ABSTRACT

A baggage identification system has a label and a key fob. The label has a front face with a distinctive pattern thereon, and a rear face with an adhesive thereon. A backing material attached to the adhesive on the rear face of the label is removable to expose the adhesive for affixing the label to the baggage. The key fob has a design thereon matching the design on the label. A pocket on the front face of the label can hold an item of personal identification. Perforations along a peripheral edge allows peripheral edge portions of the label to be removed to increase label adhesion.

3 Claims, 2 Drawing Sheets

PERSONAL BAGGAGE IDENTIFICATION SYSTEM

CROSS-REFERENCE TO RELATED APPLICATIONS

This application is a continuation-in-part of application Ser. No. 10/956,390 filed Oct. 1, 2004 now U.S. Pat. No. 7,195,158 entitled Baggage Identification System.

TECHNICAL FIELD OF THE INVENTION

The present invention pertains primarily to an apparatus and method for identifying specific baggage, particularly in a transportation baggage claim facility.

BACKGROUND OF THE INVENTION

There is a finite number of different baggage sizes and shapes manufactured making it almost impossible to identify a particular piece of baggage by its size or shape from among the many pieces of baggage in a transportation baggage claim facility. The number of exterior colors and exterior covering patterns for baggage is also limited making baggage identification by color or pattern difficult. Accordingly, it will be appreciated that it would be highly desirable to identify baggage at a baggage claim facility without relying on the size, shape color, or other physical attributes of the baggage.

Numerous tags exist to be tied to a piece of baggage for identification. Some tags are business cards or address cards that are unique to a person. Other tags are pictures or photographs of a person for positive identification. A problem with tags and labels is that they are physically small requiring a person to get close proximity to the baggage to read the card or recognize the picture or photograph because physical attributes of modern baggage are insufficient for identification. Accordingly, it will be appreciated that it would be highly desirable to have an apparatus and method for identifying particular baggage at a baggage claim facility at a distance without relying on the physical attributes of the baggage, and for positively identifying particular baggage in closer proximity.

SUMMARY OF THE INVENTION

The present invention is directed to overcoming one or more of the problems set forth above. According to one aspect of the present invention, a personal baggage identification system comprises a label having a front face and a rear face with the front face having a distinctive pattern thereon and with the rear face having an adhesive thereon. A paper backing material is removably attached to the adhesive on the rear face of the label. A pocket attached to the front face of the label has a size sufficient for receiving an item of personal identification. A key fob has a pattern thereon matching the pattern on the label.

The pocket provides a holding and display place for a business card, picture or other item of unique identification for positively distinguishing one labeled bag from another, if necessary.

According to another aspect of the invention, a personal baggage identification system comprises a label having a front face, a rear face, and a peripheral edge portion. The front face has a distinctive pattern thereon and the rear face having an adhesive thereon. The peripheral edge portion has at least one peripheral perforation dividing the peripheral edge portion into inner and outer edge portions with the outer edge portion being detachable from the inner edge portion along the at least one peripheral perforation. A paper backing material is removably attached to the adhesive on the rear face of the label. A key fob has a pattern thereon matching the pattern on the label.

The perforations facilitate removing a portion of the label which reduces the size of the label, and removes the edge of the label which may loosen. The removal process allows the label to be repeatedly.

The system is simple to use requiring only that the user attach the key fob to the keys normally carried on the user and attach the label to the baggage. Using the pocket for a piece of unique identification ensures positive baggage identification. When retrieving baggage from the baggage claim area, the user simply matches the pattern on the key fob with the pattern on the label on the baggage, and checks the pocket identification for confirmation.

These and other aspects, objects, features and advantages of the present invention will be more clearly understood and appreciated from a review of the following detailed description of the preferred embodiments and appended claims, and by reference to the accompanying drawings

DETAILED DESCRIPTION OF THE PREFERRED EMBODIMENTS

Figure 1:
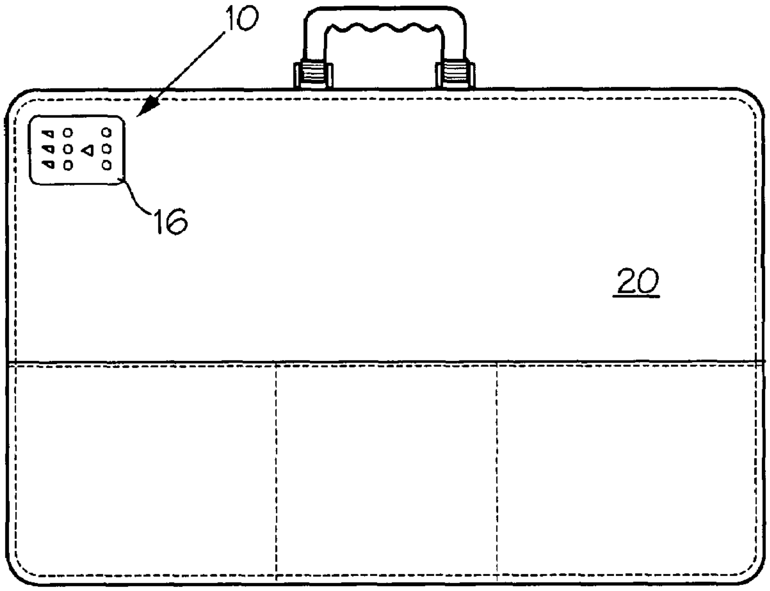
FIG. 1 is a front view of a preferred embodiment of a label imprinted with a pattern attached to a piece of baggage according to the present invention.
Figure 2:
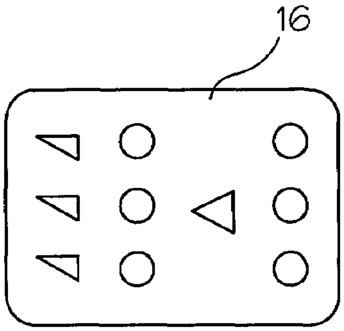
FIG. 2 is a front view of the label illustrated in FIG. 1.
Figure 3:
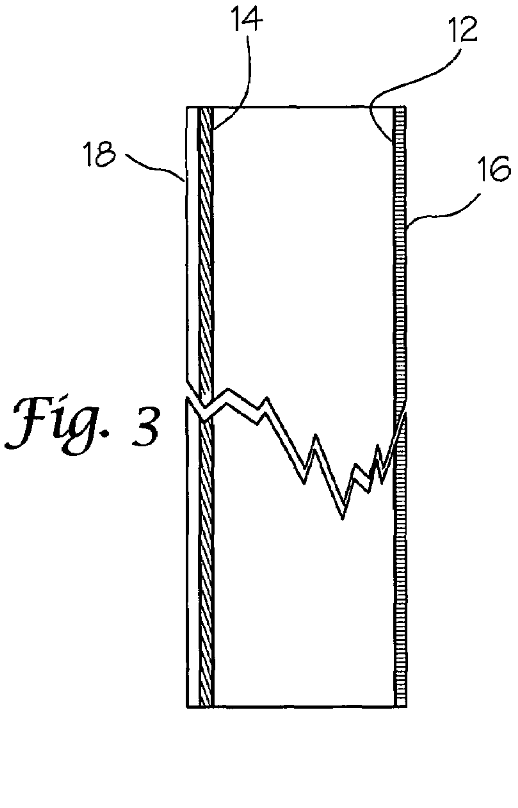
FIG. 3 is an end view of the label illustrated in FIG. 2.

Referring to FIGS. 1-4, a baggage identification system for identifying baggage at a transportation baggage claim facility, includes a label 10 having a front face 12 and a rear face 14. The front face 12 has a distinctive pattern or design 16 thereon. the pattern or design 16 may, in its simplest form, be a distinctive or unique color or may be a geometric pattern. The pattern is preferably imprinted on the front face 12 but may be integrally formed with the front face, embossed or applied by other means.

The rear face 14 of the label 10 has an adhesive 18 thereon for attaching the label to the baggage 20. A backing material 18 is removably attached to the adhesive on the rear face of the label. The backing material 18 is preferably paper that is easily removed from the adhesive.

Figure 4:
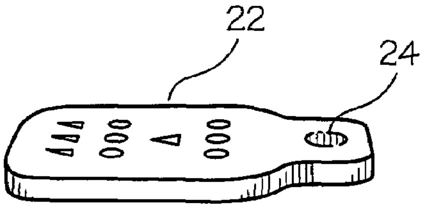
FIG. 4 is a key fob imprinted with the same pattern as the label of FIG. 2.

Referring to FIG. 4, the baggage identification system includes a key fob 22 that has a pattern or design thereon matching the design on the label. The key fob has an opening 24 for receiving a key ring or the like.

Figure 5:
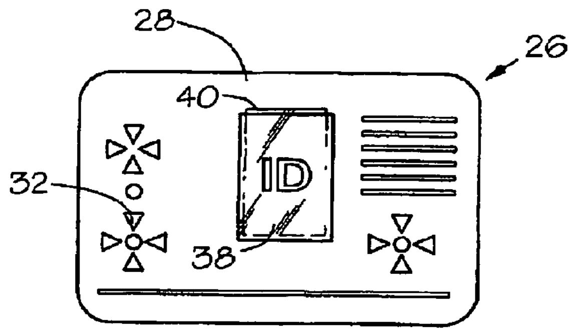
FIG. 5 is a front view of a label, similar to FIGS. 1-4, but illustrating another preferred embodiment featuring a pocket for personal identification according to the present invention.
Figure 6:
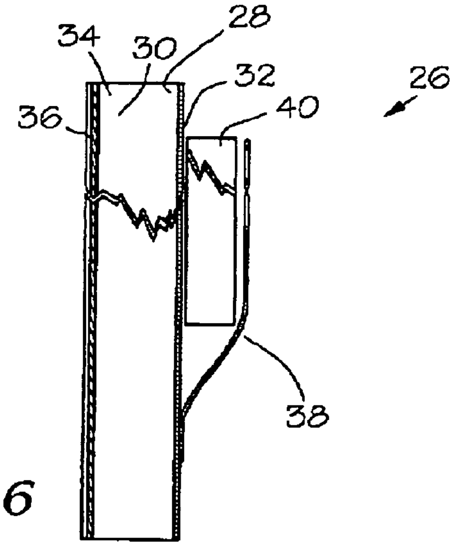
FIG. 6 is an end view of the label illustrated in FIG. 5.

Referring now to FIGS. 5-6, a baggage identification system for identifying baggage at a transportation baggage claim facility, includes a label 26 having the same basic construction as label 10 of FIGS. 1-4 with a front face 28 and a rear face 30. The front face 28 has a distinctive pattern 32 thereon. The pattern is preferably imprinted on the front face 12 but may be integrally formed with the front face, embossed or applied by other means. The rear face 30 of the label has an adhesive 34 thereon for attaching the label to the baggage. A backing material 36 is removably attached to the adhesive 34 on the rear face 30 of the label 26. The backing material 36 is preferably paper that is easily removed from the adhesive.

Still referring to FIGS. 5-6, a pocket 38 is attached to front face 28 of label 26 for receiving an item of personal identification 40 such as a business card, address card, picture or photograph. Pocket 38 is preferably constructed of a rectangular piece of plastic material bonded on three sides to front face 28. As illustrated, the open end of pocket 38 is oriented upward, but could be oriented horizontally as desired or any orientation between vertical and horizontal. The plastic material is preferably transparent so that the personal identification 40 is visible through it and so that the distinctive pattern is visible when there is no item of personal identification. By item of personal identification is meant any item or article that a person can use to distinguish himself from others, preferably without divulging sensitive, privileged or confidential information, or the like.

Figure 7:
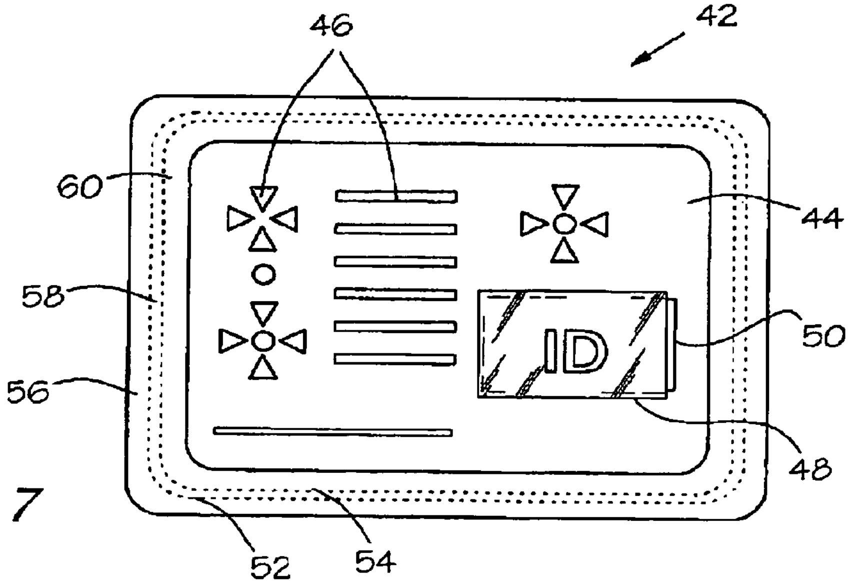
FIG. 7 is a front view of a label, similar to FIG. 5, but illustrating another preferred embodiment featuring perforated sections according to the present invention.

Referring now to FIG. 7, a label 42 has the same basic construction as label 26 of FIGS. 5-6 with a front face 44 having a distinctive pattern 46 thereon. A pocket 48 is attached to front face 44 of label 42 for receiving an item of personal identification 50 such as a business card, address card, picture or photograph. As illustrated, the open end of pocket 48 is oriented horizontally, but could be oriented vertically as desired or any orientation between vertical and horizontal. Pocket 48 is preferably constructed of a rectangular piece of plastic material bonded on three sides to front face 44. The plastic material is preferably transparent so that the personal identification 50 is visible through it and so that the distinctive pattern 46 is visible when there is no item of personal identification.

Still referring to FIG. 7, label 42 has a peripheral edge portion having at least one, but preferably two, peripheral perforations 52, 54 dividing the peripheral edge portion into inner, intermediate and outer edge portions 60, 58, 56. The outer and intermediate edge portions 56, 58 are detachable from the inner edge portion 60 along the peripheral perforations 52, 54. During use of the label, the adhesive along peripheral edge portion may fail causing the outer edge portion 56 to curl away from the baggage. Removing outer edge portion 56 before intermediate edge portion 58 begins to curl extends the useful life of the label. Likewise, removing intermediate edge portion 58 before inner edge portion 60 begins to curl extends the useful life of the label. Also, the detachable segments may be removed to reduce the size of the label so that the label more easily fits a particular piece of baggage.

It can now be appreciated that an apparatus and method for identifying baggage has been presented. The apparatus includes an adhesive backed label with a distinctive pattern or design on its front face, and a key fob. The label is affixed to the baggage using the adhesive backing. At the destination, the user matches the design on the key fob on the user with the design on the label on the baggage. For confirmation, personal identification contained in a pocket on the front of the label is checked by the user.

The method for identifying baggage at a transportation baggage claim facility includes imprinting a distinctive pattern on a front face of a label, attaching a pocket to the front face, applying an adhesive to a rear face of the label, and applying a paper backing material to the rear face of the label and covering the adhesive. The method includes applying the distinctive pattern to a key fob. The next steps are removing the paper backing material from the rear face of the label, applying the label to a piece of baggage, and inserting an item of personal identification into the pocket. The final step is matching the fob with the label on the baggage at the baggage claim facility having the item of personal identification.

The personal baggage identification system requires two parts that work together. One part is the label that attaches to the baggage, and the other part is the key fob that stays with the user. The distinctive pattern combined with the luggage shape is a simple identification system that is always ready to use. The second part of the identification system is the key fob which has the same pattern so that a user does not have to remember what pattern has been used. The personal identification in the pocket is used for positive identification once the baggage is located using the label and fob.

While the invention has been described with particular reference to the preferred embodiments, it will be understood by those skilled in the art that various changes may be made and equivalents may be substituted for elements of the preferred embodiment without departing from invention. For example, while it is anticipated that the label will be constructed of inexpensive paper or imprintable material and used for a single trip, it can be made of a more durable paper or paper-like material or plastic and used for multiple trips. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. For example, the label and key fob can have reflective or high visibility patterns or designs to aid in recognition. It is accordingly intended that the claims shall cover all such modifications and applications as do not depart from the true spirit and scope of the invention.

ELEMENT LIST

10 label
12 front face
14 rear face
16 distinctive pattern
18 adhesive
20 baggage
22 key fob
24 opening
26 label
28 front face
30 rear face
32 distinctive pattern
34 adhesive
36 backing material
38 pocket
40 personal identification
42 label
44 front face
46 distinctive pattern
48 pocket
50 personal identification
52, 54 peripheral perforations
56 inner edge portion
58 intermediate edge portion
60 outer edge portion

What is claimed is:

1. A personal baggage identification system, comprising:

a label having a front face, a rear face, and a peripheral edge portion, said front face having a distinctive pattern thereon, said rear face having an adhesive thereon, said peripheral edge portion having at least one peripheral perforation dividing said peripheral edge portion into inner and outer edge portions, said outer edge portion being detachable from said inner edge portion along said at least one peripheral perforation to thereby remove a damaged outer edge portion an extend the useful life of said label;

a pocket attached to said front face of said label having a size sufficient for receiving an item of personal identification;

a paper backing material removably attached to said adhesive on said rear face of said label; and a key fob having a pattern thereon matching said pattern on said label.

2. A personal baggage identification system, comprising:

a label having a front face, a rear face, and a peripheral edge portion bounding said front face, said front face having a distinctive pattern thereon, said rear face having an adhesive thereon, said peripheral edge portion having two peripheral perforations dividing said peripheral edge portion into inner and outer edge portions, said outer edge portion being detachable from said inner edge portion along one of said peripheral perforations, said inner edge portion being detachable from said front face along the other of said peripheral perforations;

a paper backing material removably attached to said adhesive on said rear face of said label;

a pocket attached to said front face of said label having a size sufficient for receiving an item of personal identification; and a key fob having a pattern thereon matching said pattern on said label.

3. A personal baggage identification system, as set forth in claim 2, wherein detaching said peripheral portions reduces the size of said label.

* * * * *